(12) United States Patent
Bartley

(10) Patent No.: US 10,376,052 B1
(45) Date of Patent: Aug. 13, 2019

(54) FISHING ROD STORAGE ASSEMBLY

(71) Applicant: Christopher Bartley, Kingston, TN (US)

(72) Inventor: Christopher Bartley, Kingston, TN (US)

( * ) Notice: Subject to any disclaimer, the term of this patent is extended or adjusted under 35 U.S.C. 154(b) by 0 days.

(21) Appl. No.: 15/955,800

(22) Filed: Apr. 18, 2018

(51) Int. Cl.
*A47B 81/00* (2006.01)
*B62B 1/24* (2006.01)
*A47F 7/00* (2006.01)

(52) U.S. Cl.
CPC .............. *A47B 81/005* (2013.01); *B62B 1/24* (2013.01); *A45F 2200/0566* (2013.01); *A47F 7/0028* (2013.01)

(58) Field of Classification Search
CPC ......... A47B 81/005; B62B 1/24; B62B 3/005; B62B 3/04; B62B 2202/402; A45F 2200/0566; A47F 7/0028; A47F 7/005; A47F 5/10; F16B 2/065; A01K 89/00; A01K 97/10

See application file for complete search history.

(56) References Cited

U.S. PATENT DOCUMENTS

| 3,109,084 | A | * | 10/1963 | Walsh | B01L 7/00 211/74 |
| 4,127,202 | A | * | 11/1978 | Jennings | B60D 1/173 280/408 |
| 4,284,603 | A | * | 8/1981 | Korom | B01L 9/06 210/323.1 |
| 4,311,262 | A | | 1/1982 | Morin | |
| 5,133,939 | A | * | 7/1992 | Mahe | B01L 9/06 211/74 |
| 5,159,777 | A | | 11/1992 | Gonzalez | |
| D378,456 | S | | 3/1997 | Speicher | |
| 5,632,388 | A | * | 5/1997 | Morrison | B01L 9/06 211/170 |
| D383,835 | S | | 9/1997 | Gibbs | |
| 5,884,755 | A | * | 3/1999 | Vaccarella | A47G 1/12 206/0.84 |
| 5,904,388 | A | * | 5/1999 | Seibel | A45C 13/28 294/141 |
| 6,076,298 | A | | 6/2000 | Teel | |
| 6,378,699 | B1 | * | 4/2002 | Churchill | A01K 97/01 206/315.11 |
| D483,668 | S | * | 12/2003 | Le Roux | D9/434 |
| 6,742,789 | B1 | | 6/2004 | Nowak | |
| 6,883,267 | B1 | | 4/2005 | Pruitt | |

(Continued)

*Primary Examiner* — Ko H Chan

(57) ABSTRACT

A fishing rod storage assembly for transporting and storing multiple rods includes a pair of end plates coupled singly to and extending perpendicularly from a front and a back of a frame. A housing is pivotally coupled to and extends between the end plates. A plurality of first orifices and a plurality of second orifices are positioned through a top and a bottom of the housing, respectively. Each second orifice is in vertical alignment with an associated first orifice to permit insertion of a handle of respective fishing pole to couple the respective fishing pole to the housing. Each of a pair of wheels is rotationally coupled proximate to the back and a respective opposing side of the frame. A handhold that is coupled to a respective end plate is configured to be grasped to lift the front of the frame to position the wheels to roll on a surface.

18 Claims, 8 Drawing Sheets

(56) References Cited

U.S. PATENT DOCUMENTS

| | | | |
|---|---|---|---|
| 7,150,123 B1 * | 12/2006 | Fox | A01K 97/01 |
| | | | 43/54.1 |
| D594,058 S * | 6/2009 | Hicks | D19/105 |
| 7,878,514 B1 * | 2/2011 | Hopkins | B62B 3/08 |
| | | | 280/47.26 |
| 8,746,469 B1 | 6/2014 | De La Torre | |
| 9,227,199 B2 * | 1/2016 | Ellis | B03C 1/288 |
| 9,282,797 B1 * | 3/2016 | Soto | A45C 11/20 |
| 9,776,188 B1 * | 10/2017 | Kamees | B01L 9/06 |
| 9,861,087 B1 * | 1/2018 | Arrazola | A01K 97/10 |

* cited by examiner

FISHING ROD STORAGE ASSEMBLY

The disclosure and prior art relates to storage assemblies and more particularly pertains to a new storage assembly for transporting and storing multiple fishing rods.

(h) BRIEF SUMMARY OF THE INVENTION

An embodiment of the disclosure meets the needs presented above by generally comprising a pair of end plates coupled singly to and extending perpendicularly from a front and a back of a frame. A housing is pivotally coupled to and extends between the end plates. A plurality of first orifices and a plurality of second orifices are positioned through a top and a bottom of the housing, respectively. Each second orifice is in vertical alignment with an associated first orifice to permit insertion of a handle of respective fishing pole to couple the respective fishing pole to the housing. Each of a pair of wheels is rotationally coupled proximate to the back and a respective opposing side of the frame. A handhold that is coupled to a respective end plate is configured to be grasped to lift the front of the frame to position the wheels to roll on a surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
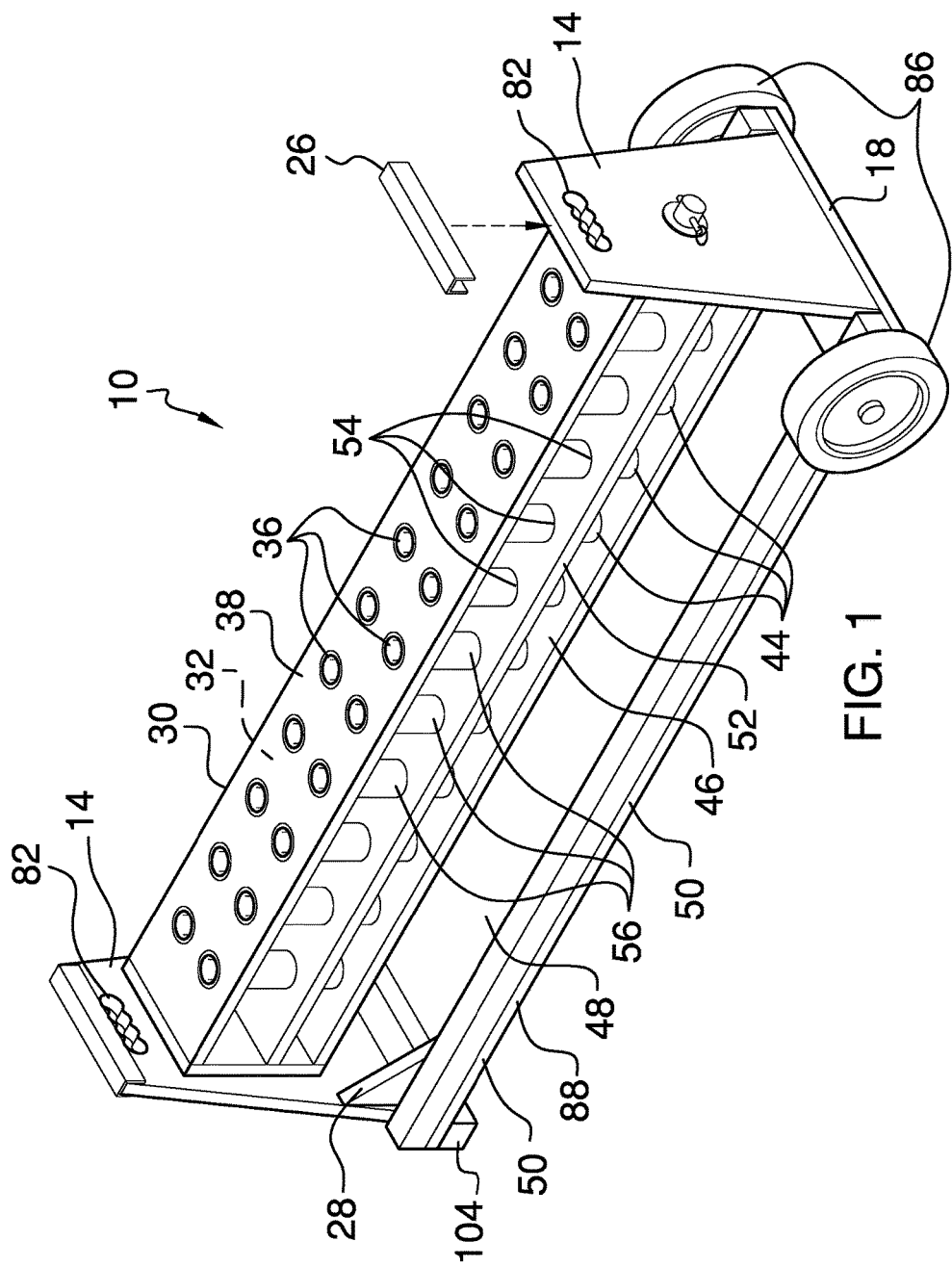
FIG. 1 is an isometric perspective view of a fishing rod storage assembly according to an embodiment of the disclosure.

With reference now to the drawings, and in particular to FIGS. 1 through 8 thereof, a new storage assembly embodying the principles and concepts of an embodiment of the disclosure and generally designated by the reference numeral 10 will be described.

Figure 2:
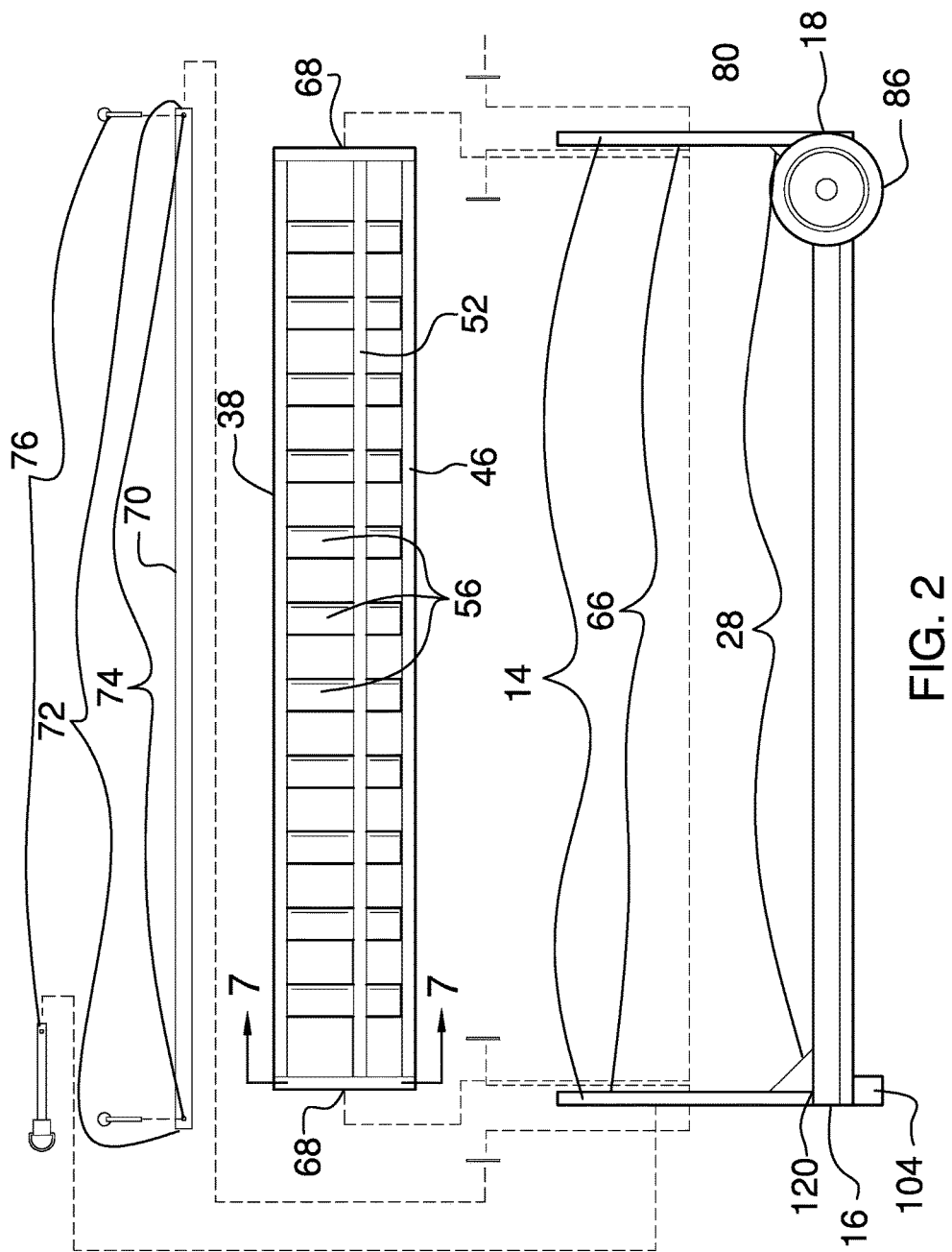
FIG. 2 is an exploded view of an embodiment of the disclosure.
Figure 3:
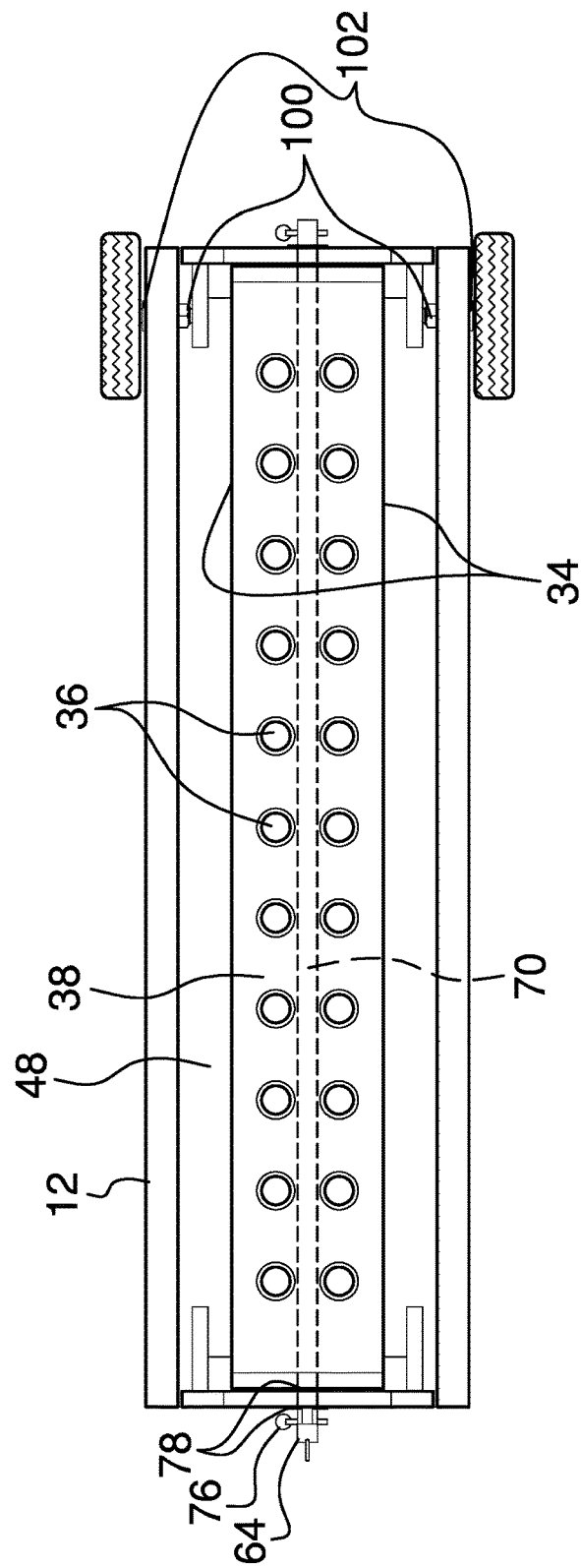
FIG. 3 is a top view of an embodiment of the disclosure.
Figure 4:
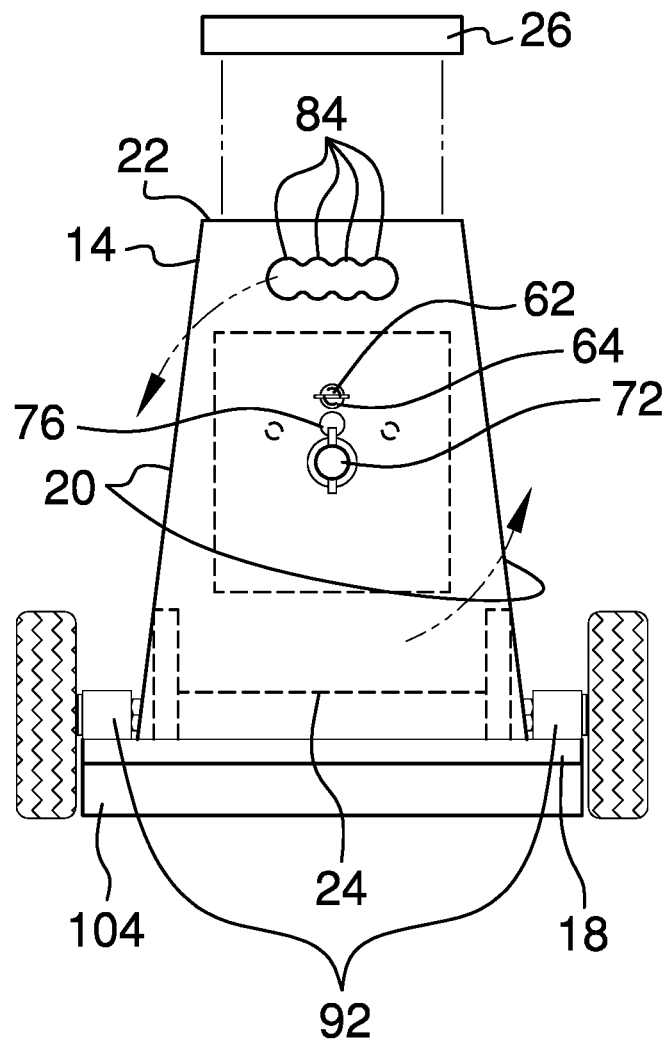
FIG. 4 is a back view of an embodiment of the disclosure.

As best illustrated in FIGS. 1 through 8, the fishing rod storage assembly 10 generally comprises a frame 12 and a pair of end plates 14. The frame 12 is substantially rectangularly shaped, as shown in FIG. 1. The end plates 14 are coupled singly to and extend perpendicularly from a front 16 and a back 18 of the frame 12. Each end plate 14 has opposing side edges 20, an upper edge 22, and a lower edge 24. The opposing side edges 20 extend transversely between the lower edge 24 and the upper edge 22. The lower edge 24 is longer than the upper edge 22 so that the end plate 14 is isosceles trapezoidally shaped, as shown in FIG. 4. Each of a pair of caps 26 is coupled to the upper edge 22 of a respective end plate 14 to protect the respective end plate 14.

Each of a set of braces 28 is coupled to the frame 12 proximate to a respective corner 120 of the frame 12, as shown in FIG. 3. The braces 28 are triangularly shaped. Each brace 28 is coupled to an associated end plate 14 to stabilize the associated end plate 14 relative to the frame 12.

A housing 30 that defines an interior space 32 is pivotally coupled to and extends between the end plates 14. The housing 30 is selectively pivotable relative to the end plates 14. The housing 30 is rectangularly box shaped. The housing 30 has opposing faces 34 that are open.

A plurality of first orifices 36 is positioned through a top 38 of the housing 30, as shown in FIG. 3. The plurality of first orifices 36 are positioned in two rows 40. Each row 40 extends from proximate to opposing ends 42 of the housing 30. The plurality of first orifices 36 comprises twenty-two first orifices 36.

A plurality of second orifices 44 is positioned through a bottom 46 of the housing 30. Each second orifice 44 is in vertical alignment with an associated first orifice 36. Each first orifice 36 and an associated second orifice 44 are configured to insert a handle of respective fishing pole to couple the respective fishing pole to the housing 30.

A base plate 48 is coupled to and extends inwardly from a perimeter 50 of the frame 12. The base plate 48 is configured to position items of a user. A center plate 52 is coupled to and extends between the opposing ends 42 of the housing 30. The center plate 52 is positioned between the top 38 and the bottom 46 of the housing 30, as shown in FIG. 2.

A plurality of third orifices 54 is positioned through the center plate 52. Each third orifice 54 is in vertical alignment with an associated first orifice 36 and an associated second orifice 44.

Figure 5:
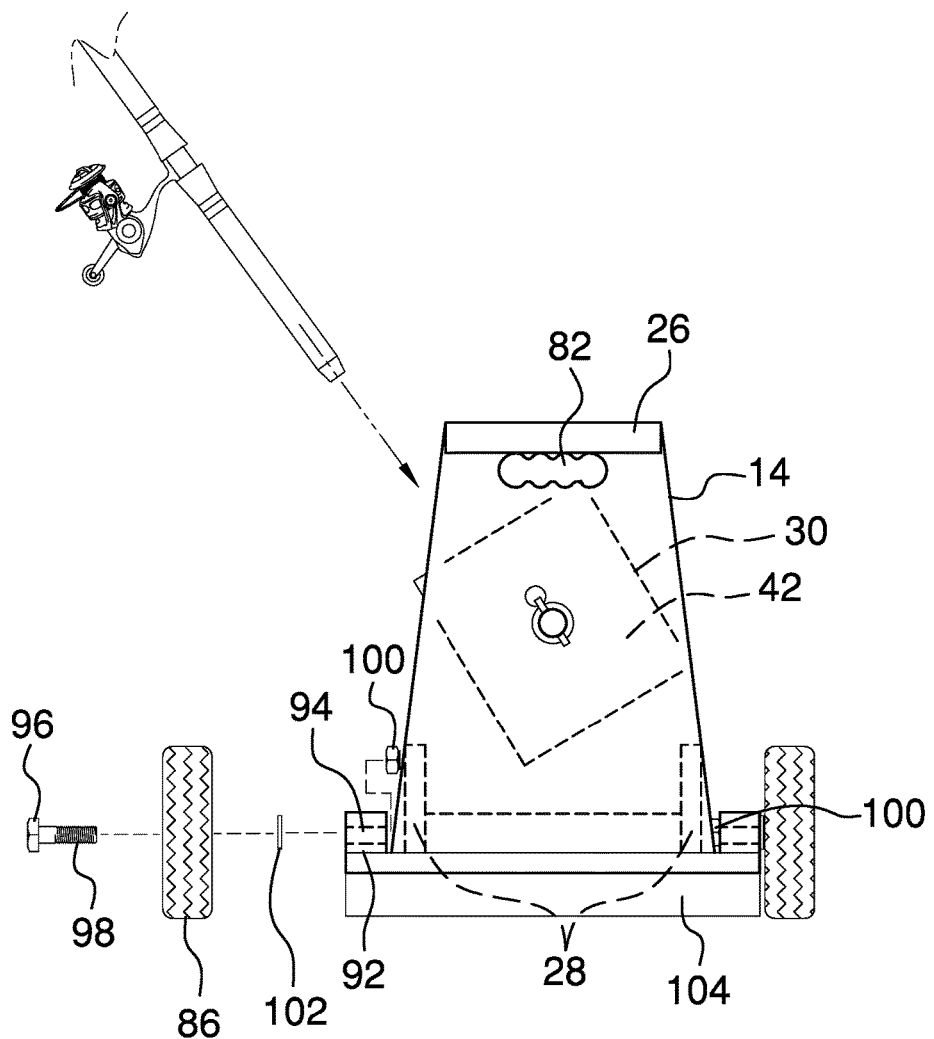
FIG. 5 is a front view of an embodiment of the disclosure.
Figure 6:
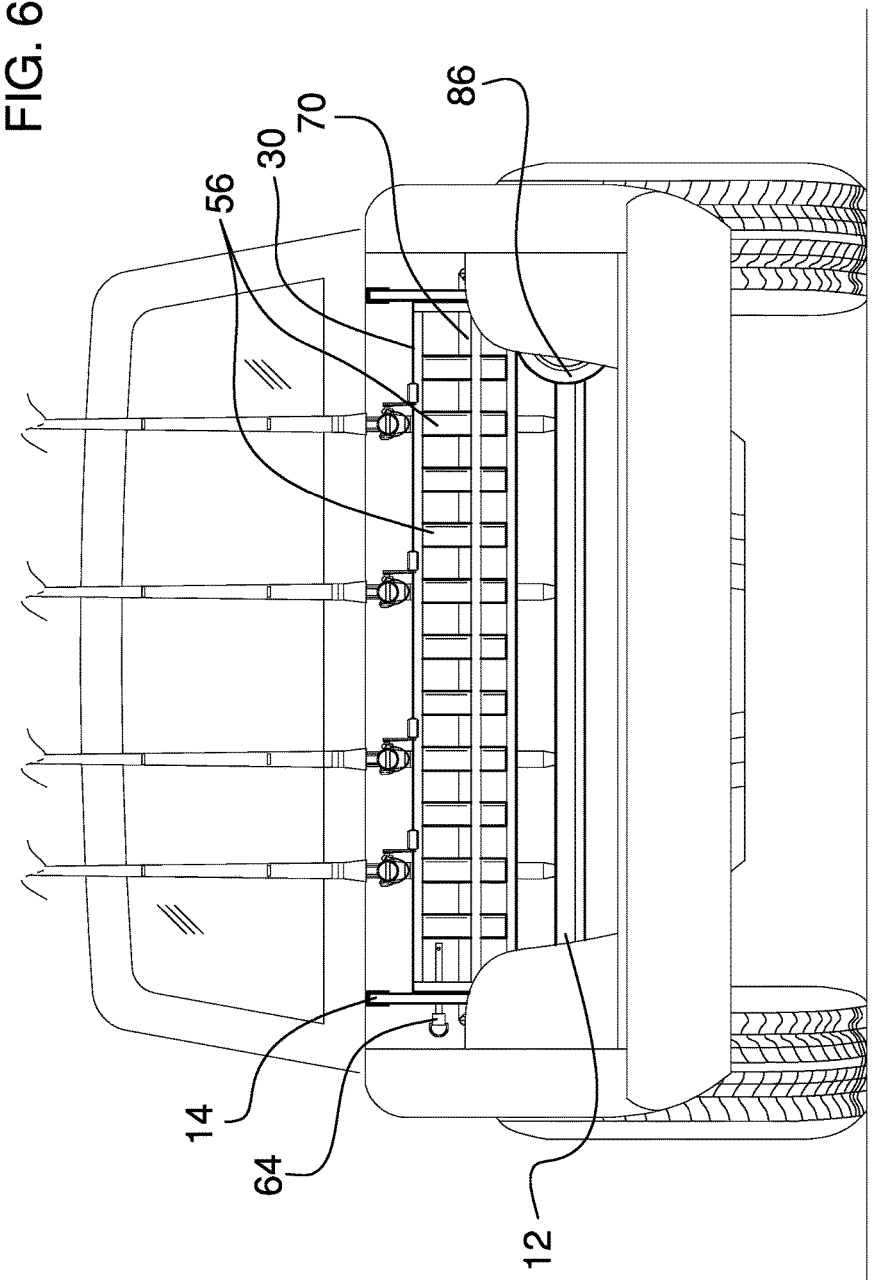
FIG. 6 is an in-use view of an embodiment of the disclosure.

Each of a plurality of tubes 56 is coupled to the top 38 and the bottom 46 of the housing 30 and extends between a respective first orifice 36, an associated third orifice 54, and an associated second orifice 44, as shown in FIG. 2. The tube 56 is configured to guide the handle of the respective fishing pole through the interior space 32, as shown in FIG. 5.

Figure 7:
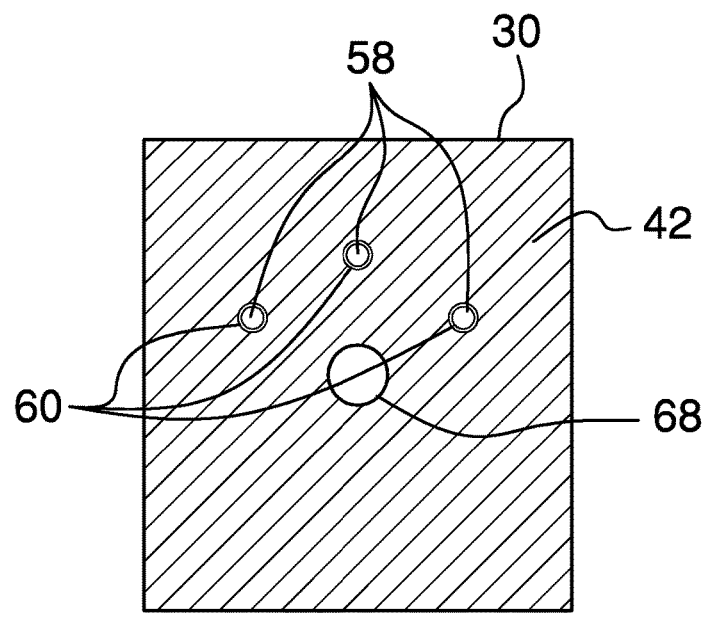
FIG. 7 is a cross-sectional view of an embodiment of the disclosure.

A set of first apertures 58 is positioned through a respective opposing end 42 of the housing 30, as shown in FIG. 7. The set of first apertures 58 comprises three first apertures 58. Each of a set of bushings 60 is positioned in a respective first aperture 58 and is coupled to the respective opposing end 42 of the housing 30.

A second aperture 62 is positioned through an associated end plate 14, as shown in FIG. 4. The second aperture 62 is complementary to and selectively alignable with the first apertures 58. A lock pin 64, which is complementary to the first apertures 58 and the second aperture 62, is positioned to be inserted into the second aperture 62 and a respective first aperture 58 to fixedly position the housing 30 relative to the end plates 14.

Each of a pair of first holes 66 is substantially centrally positioned through a respective end plate 14, as shown in FIG. 2. Each of a pair of second holes 68 is substantially centrally positioned through a respective opposing end 42 of the housing 30, as shown in FIG. 7. A shaft 70 is positioned through the first holes 66, the second holes 68, and the interior space 32 so that each opposing terminus 72 of the shaft 70 protrudes through a respective end plate 14.

Each of a pair of channels 74 is positioned through the shaft 70 proximate to a respective opposing terminus 72 of the shaft 70, as shown in FIG. 2. Each of a pair of pins 76, which are complementary to the channels 74, is positioned to be inserted into a respective channel 74 to prevent horizontal movement of the shaft 70 relative to the end plates 14.

Each of two pairs of washers 78 is positioned on the shaft 70 so that each washer 78 of the pair of washers 78 abuts a respective opposing face 80 of a respective end plate 14, as shown in FIG. 2. The pairs of washers 78 is positioned to facilitate pivoting of the housing 30 relative to the end plates 14.

Each of a pair of handholds 82 is coupled to a respective end plate 14 distal from the frame 12, as shown in FIG. 1. Each handhold 82 comprises a set of four linearly positioned holes 84. The linearly positioned holes 84 overlap so that the handhold 82 is configured to insert four digits of a hand of the user.

Each of a pair of wheels 86 is rotationally coupled to a respective opposing side 88 of the frame 12 proximate to the back 18 of the frame 12, as shown in FIG. 3. A respective handhold 82 is configured to be grasped to lift the front 16 of the frame 12 to position the wheels 86 to roll on a surface to locomote the frame 12. The wheels 86 permit the assembly 10 and the fishing rods that are coupled to the housing 30 to be easily moved from a storage location to a vehicle. The handholds 82 allow one or more users to position the assembly 10 in a vehicle, such as in a bed of a truck, and to remove the assembly 10 from the vehicle at a desired location. The housing 30 and the fishing rods that are coupled to the housing 30 can be pivoted relative to the end plates 14 and the vehicle to lower the fishing rods toward the bed of the truck to prevent contact with overhead obstacles.

Each of a pair of bolt holes 90 is axially positioned through a respective wheel 86, as shown in FIG. 5. Each of a pair of extrusions 92 is coupled to and extends upwardly from the frame 12. Each of a pair of bolt channels 94 is positioned through a respective extrusion 92. Each of a pair of axle bolts 96 is inserted through a respective bolt hole 90 and a respective bolt channel 94 so that a threaded end 98 of the axle bolt 96 protrudes from the respective extrusion 92. Each of a pair of nuts 100 is coupled to the threaded end 98 of a respective axle bolt 96 to rotationally couple the wheel 86 to the frame 12. Each of a pair of rings 102 is positioned between a respective wheel 86 and a respective extrusion 92 to facilitate rotation of the respective wheel 86.

A slat 104 is coupled to and extends downwardly from the front 16 of the frame 12, as shown in FIG. 2. The slat 104 is configured to contact the surface, such as a bed of a truck, so that the housing 30 is positioned substantially horizontally to the surface.

Figure 8:
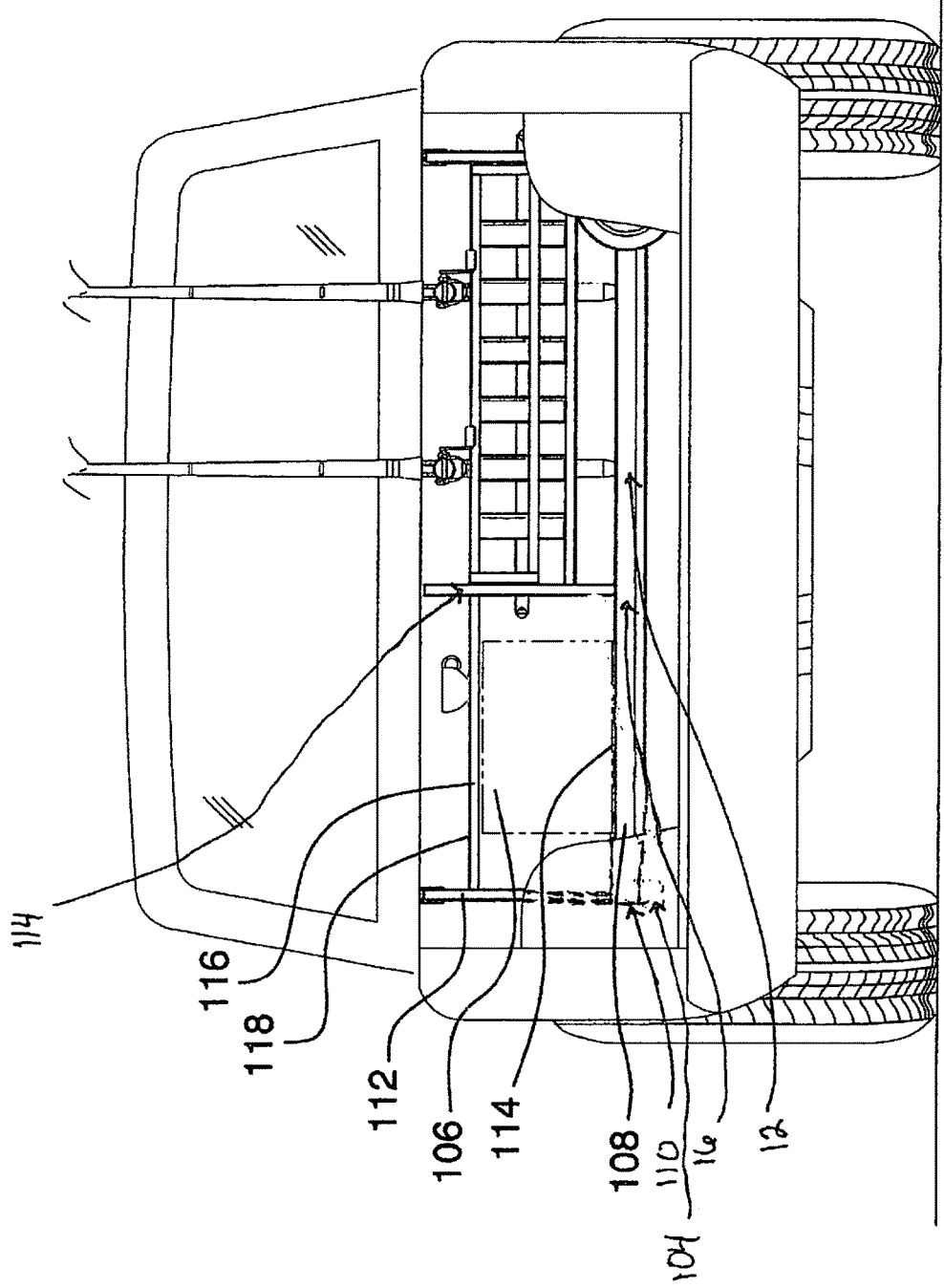
FIG. 8 is an in-use view of an embodiment of the disclosure.

In another embodiment of the invention, as shown in FIG. 8, an extension 106 is coupled to and extends from the front 16 of the frame 12. The extension 106 comprises an extender frame 108 that is coupled to and extends coplanarly from the frame 12. The slat 104 is coupled to a limit 110 of the extender frame 108 distal from the frame 12.

An end panel 112 is coupled to and extends perpendicularly from the limit 110 of the extender frame 108. The end panel 112 is shaped complementarily to the end plates 14. An associated one of the pair of handholds 82 is coupled to the end panel 112. A base panel 114 is coupled to the extender frame 108. The base panel 114 is configured to position a cooler.

A shelf panel 116 is coupled to and extends between the end panel 112 and the end plate 14 that is coupled to the front 16 of the frame 12. The shelf panel 116 is positioned parallel planarly with and distal to the base panel 114. The shelf panel 116 is configured to be used as a table top 118.

In use, the wheels 86 permit the assembly 10 and the fishing rods that are coupled to the housing 30 to be easily moved from the storage location to the vehicle. The handholds 82 allow one or more users to position the assembly 10 in the vehicle, such as in the bed of the truck, and to remove the assembly 10 from the vehicle at the desired location. The housing 30 and the fishing rods that are coupled to the housing 30 can be pivoted relative to the end plates 14 and the vehicle to lower the fishing rods toward the bed of the truck to prevent contact with the overhead obstacles.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing rod storage assembly comprising:
   a frame, said frame being substantially rectangularly shaped,
   a pair of end plates, said end plates being coupled singly to and extending perpendicularly from a front and a back of said frame;
   a housing defining an interior space, said housing being pivotally coupled to and extending between said end plates wherein said housing is selectively pivotable relative to said end plates;
   a plurality of first orifices positioned through a top of said housing;
   a plurality of second orifices positioned through a bottom of said housing such that each said second orifice is in vertical alignment with an associated said first orifice wherein each said first orifice and an associated said second orifice are configured for inserting a handle of respective fishing pole for coupling the respective fishing pole to said housing;

a pair of handholds, each said handhold being coupled to a respective said end plate distal from said frame;

a pair of wheels, each said wheel being rotationally coupled to a respective opposing side of said frame proximate to said back of said frame wherein a respective said handhold is configured for grasping for lifting said front of said frame positioning said wheels for rolling on a surface for locomoting said frame;

a slat coupled to and extending downwardly from said front of said frame wherein said slat is configured for contacting the surface such that said housing is positioned substantially horizontally to the surface; and an extension coupled to and extending from said front of said frame, said extension comprising:
an extender frame coupled to and extending coplanarly from said frame, said slat being coupled to a limit of said extender frame distal from said frame;
an end panel coupled to and extending perpendicularly from said limit of said extender frame, said end panel being shaped complementarily to said end plates, an associated one of said pair of handholds being coupled to said end panel;
a base panel coupled to said extender frame wherein said base panel is configured for positioning a cooler; and
a shelf panel coupled to and extending between said end panel and said end plate coupled to said front of said frame, said shelf panel being positioned parallel planarly and distal to said base panel wherein said shelf panel is configured for table top use.

2. The assembly of claim 1, further including each said end plate having opposing side edges, an upper edge, and a lower edge, said opposing side edges extending transversely between said lower edge and said upper edge such that said lower edge is longer than said upper edge wherein said end plate is isosceles trapezoidally shaped.

3. The assembly of claim 1, further including a pair of caps, each said cap being coupled to an upper edge of a respective said end plate for protecting said respective said end plate.

4. The assembly of claim 1, further including a set of braces, each said brace being coupled to said frame proximate to a respective corner of said frame, each said brace being coupled to an associated said end plate for stabilizing said associated said end plate relative to said frame.

5. The assembly of claim 4, further including said braces being triangularly shaped.

6. The assembly of claim 1, further including said housing being rectangularly box shaped, said housing having opposing faces, said opposing faces being open.

7. The assembly of claim 1, further including said plurality of first orifices being positioned in two rows, each said row extending from proximate to opposing ends of said housing.

8. The assembly of claim 1, further including said plurality of first orifices comprising twenty-two said first orifices.

9. The assembly of claim 1, further including a base plate coupled to and extending inwardly from a perimeter of said frame wherein said base plate is configured for positioning items of a user.

10. The assembly of claim 1, further comprising:
a center plate coupled to and extending between said opposing ends of said housing, said center plate being positioned between said top and said bottom of said housing; and
a plurality of third orifices, each said third orifice being positioned through said center plate such that said third orifice is in vertical alignment with an associated said first orifice and an associated said second orifice.

11. The assembly of claim 10, further including a plurality of tubes, each said tube being coupled to said top and said bottom of said housing and extending between a respective said first orifice, an associated said third orifice, and an associated said second orifice wherein said tube is configured for guiding the handle of the respective fishing pole through said interior space.

12. The assembly of claim 1, further comprising:
a set of first apertures positioned through a respective said opposing end of said housing, said set of first apertures comprising three said first apertures;
a second aperture positioned through an associated said end plate, said second aperture being complementary to and selectively alignable with said first apertures; and
a lock pin complementary to said first apertures and said second aperture wherein said lock pin is positioned for inserting into said second aperture and a respective said first aperture for fixedly positioning said housing relative to said end plates.

13. The assembly of claim 12, further including a set of bushings, each said bushing being positioned in a respective said first aperture and coupled to said respective said opposing end of said housing.

14. The assembly of claim 1, further comprising:
a pair of first holes, each said first hole being substantially centrally positioned through a respective said end plate;
a pair of second holes, each said second hole being substantially centrally positioned through a respective said opposing end of said housing;
a shaft positioned through said first holes, said second holes, and said interior space such that each opposing terminus of said shaft protrudes through a respective said end plate;
a pair of channels, each said channel being positioned through said shaft proximate to a respective said opposing terminus of said shaft; and
a pair of pins, said pins being complementary to said channels wherein each said pin is positioned for inserting into a respective said channel for preventing horizontal movement of said shaft relative to said end plates.

15. The assembly of claim 14, further including two pairs of washers, each said pair of washers being positioned on said shaft such that each said washer of said pair of washers abuts a respective opposing face of a respective said end plate wherein said pairs of washers are positioned for facilitating pivoting of said housing relative to said end plates.

16. The assembly of claim 1, further including each said handhold comprising a set of four linearly positioned holes, said linearly positioned holes being overlapping such that said handhold is configured for inserting four digits of a hand of the user.

17. The assembly of claim 1, further comprising:
a pair of bolt holes, each said bolt hole being axially positioned through a respective said wheel;
a pair of extrusions coupled to and extending upwardly from said frame;
a pair of bolt channels, each said bolt channel being positioned through a respective said extrusion;
a pair of axle bolts wherein each said axle bolt is positioned for inserting through a respective said bolt hole and a respective said bolt channel such that a threaded end of said axle bolt protrudes from said respective said extrusion;

a pair of nuts, each said nut being coupled to said threaded end of a respective said axle bolt for rotationally coupling said wheel to said frame; and a pair of rings, each said ring being positioned between a respective said wheel and a respective said extrusion for facilitating rotation of said respective said wheel.

18. A fishing rod storage assembly comprising:

a frame, said frame being substantially rectangularly shaped, a pair of end plates, said end plates being coupled singly to and extending perpendicularly from a front and a back of said frame, each said end plate having opposing side edges, an upper edge, and a lower edge, said opposing side edges extending transversely between said lower edge and said upper edge such that said lower edge is longer than said upper edge wherein said end plate is isosceles trapezoidally shaped;

a pair of caps, each said cap being coupled to said upper edge of a respective said end plate for protecting said respective said end plate;

a set of braces, each said brace being coupled to said frame proximate to a respective corner of said frame, each said brace being coupled to an associated said end plate for stabilizing said associated said end plate relative to said frame, said braces being triangularly shaped;

a housing defining an interior space, said housing being pivotally coupled to and extending between said end plates wherein said housing is selectively pivotable relative to said end plates, said housing being rectangularly box shaped, said housing having opposing faces, said opposing faces being open;

a plurality of first orifices positioned through a top of said housing, said plurality of first orifices being positioned in two rows, each said row extending from proximate to opposing ends of said housing, said plurality of first orifices comprising twenty-two said first orifices;

a plurality of second orifices positioned through a bottom of said housing such that each said second orifice is in vertical alignment with an associated said first orifice wherein each said first orifice and an associated said second orifice are configured for inserting a handle of respective fishing pole for coupling the respective fishing pole to said housing;

a base plate coupled to and extending inwardly from a perimeter of said frame wherein said base plate is configured for positioning items of a user;

a center plate coupled to and extending between said opposing ends of said housing, said center plate being positioned between said top and said bottom of said housing;

a plurality of third orifices, each said third orifice being positioned through said center plate such that said third orifice is in vertical alignment with an associated said first orifice and an associated said second orifice;

a plurality of tubes, each said tube being coupled to said top and said bottom of said housing and extending between a respective said first orifice, an associated said third orifice, and an associated said second orifice wherein said tube is configured for guiding the handle of the respective fishing pole through said interior space;

a set of first apertures positioned through a respective said opposing end of said housing, said set of first apertures comprising three said first apertures;

a set of bushings, each said bushing being positioned in a respective said first aperture and coupled to said respective said opposing end of said housing;

a second aperture positioned through an associated said end plate, said second aperture being complementary to and selectively alignable with said first apertures;

a lock pin complementary to said first apertures and said second aperture wherein said lock pin is positioned for inserting into said second aperture and a respective said first aperture for fixedly positioning said housing relative to said end plates;

a pair of first holes, each said first hole being substantially centrally positioned through a respective said end plate;

a pair of second holes, each said second hole being substantially centrally positioned through a respective said opposing end of said housing;

a shaft positioned through said first holes, said second holes, and said interior space such that each opposing terminus of said shaft protrudes through a respective said end plate;

a pair of channels, each said channel being positioned through said shaft proximate to a respective said opposing terminus of said shaft;

a pair of pins, said pins being complementary to said channels wherein each said pin is positioned for inserting into a respective said channel for preventing horizontal movement of said shaft relative to said end plates;

two pairs of washers, each said pair of washers being positioned on said shaft such that each said washer of said pair of washers abuts a respective opposing face of a respective said end plate wherein said pairs of washers are positioned for facilitating pivoting of said housing relative to said end plates;

a pair of handholds, each said handhold being coupled to a respective said end plate distal from said frame, each said handhold comprising a set of four linearly positioned holes, said linearly positioned holes being overlapping such that said handhold is configured for inserting four digits of a hand of the user;

a pair of wheels, each said wheel being rotationally coupled to a respective opposing side of said frame proximate to said back of said frame wherein a respective said handhold is configured for grasping for lifting said front of said frame positioning said wheels for rolling on a surface for locomoting said frame;

a pair of bolt holes, each said bolt hole being axially positioned through a respective said wheel;

a pair of extrusions coupled to and extending upwardly from said frame;

a pair of bolt channels, each said bolt channel being positioned through a respective said extrusion;

a pair of axle bolts wherein each said axle bolt is positioned for inserting through a respective said bolt hole and a respective said bolt channel such that a threaded end of said axle bolt protrudes from said respective said extrusion;

a pair of nuts, each said nut being coupled to said threaded end of a respective said axle bolt for rotationally coupling said wheel to said frame;

a pair of rings, each said ring being positioned between a respective said wheel and a respective said extrusion for facilitating rotation of said respective said wheel;

a slat coupled to and extending downwardly from said front of said frame wherein said slat is configured for contacting the surface such that said housing is positioned substantially horizontally to the surface; and an extension coupled to and extending from said front of said frame, said extension comprising:

an extender frame coupled to and extending coplanarly from said frame, said slat being coupled to a limit of said extender frame distal from said frame, an end panel coupled to and extending perpendicularly from said limit of said extender frame, said end panel being shaped complementarily to said end plates, an associated one of said pair of handholds being coupled to said end panel, a base panel coupled to said extender frame wherein said base panel is configured for positioning a cooler, and a shelf panel coupled to and extending between said end panel and said end plate coupled to said front of said frame, said shelf panel being positioned parallel planarly and distal to said base panel wherein said shelf panel is configured for table top use.

\* \* \* \* \*